May 6, 1924.
W. C. FISHER
SELVAGED EDGED ENDLESS FABRIC
Filed Aug. 14, 1922
1,492,630
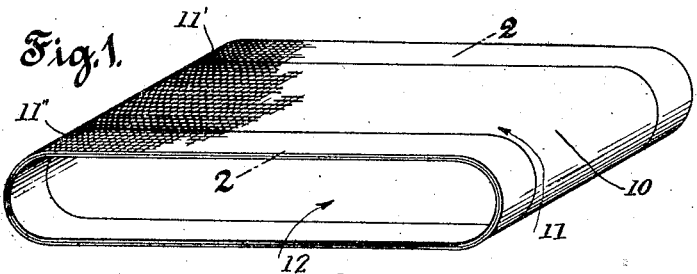
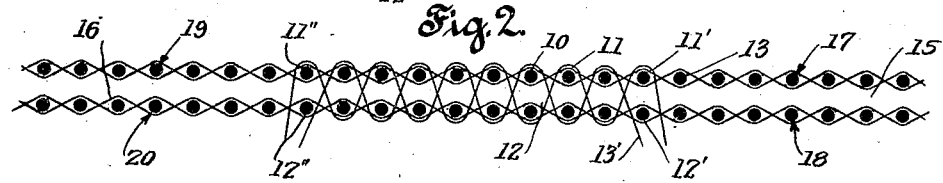
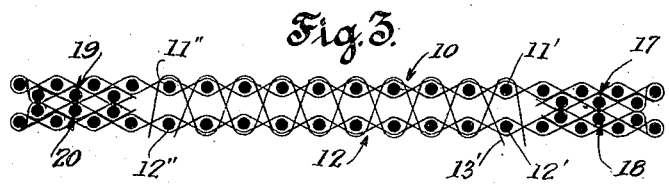
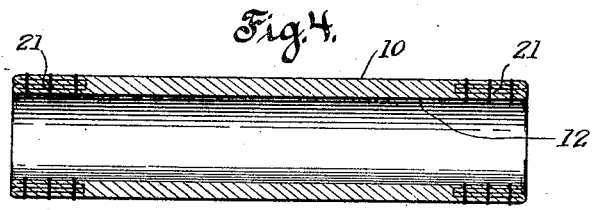
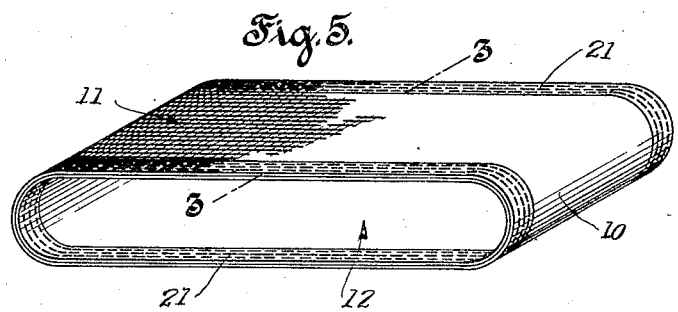
INVENTOR
William C. Fisher
BY
Chester H. Bracelton
ATTORNEY Patented May 6, 1924.

1,492,630

UNITED STATES PATENT OFFICE.

WILLIAM C. FISHER, OF MIDDLETOWN, CONNECTICUT, ASSIGNOR TO THE RUSSELL MANUFACTURING COMPANY, OF MIDDLETOWN, CONNECTICUT, A CORPORATION OF CONNECTICUT.

SELVAGED-EDGED ENDLESS FABRIC.

Application filed August 14, 1922. Serial No. 581,847.

*To all whom it may concern:*

Be it known that I, WILLIAM C. FISHER, a citizen of the United States, residing at Middletown, in the county of Middlesex and State of Connecticut, have invented certain new and useful Improvements in Selvaged-Edged Endless Fabrics, of which I declare the following to be a full, clear, and exact description.

The present invention relates to a new article of manufacture in the form of a fabric having a selvaged edge and more particularly to an endless fabric with selvaged edges capable of a large number of uses and particularly useful as an endless belt, for example.

In certain prior practices it has been customary in making an endless fabric strip or belt without tranverse joints, in order to avoid a ravelled edge, to make the same of two tubes so folded and joined as to form, when stitched together, a belt or strip with turned in edges, or to provide a double fold of the entire material of a single tube, requiring longitudinal stitching extending across the fabric to secure the structure together. The articles made accordingly are relatively expensive and require a large number of stitchings and present other disadvantages such as lines of threads out of longitudinal alignment, distortion due to uneven tension of the stitching and other features, which tend to cause an uneven running of the belt when the endless fabric is used for this purpose.

An object of the present invention is to provide an endless fabric without transverse joints made out of a single thickness of two or more plies of material, with the selvaged edge or edges so formed therefrom that the necessity of the employment of two tubes or a double lapping of a single tube and the employment of a large number of stitchings in the body of the endless fabric, are eliminated.

A further object of the invention is to provide an endless fabric of the character indicated in which the selvaged edge is accurately formed along the longitudinal threads of the body portion of the fabric so that, among other advantages, the endless strip when used as a belt will always run true on the pulleys with which it is employed.

A further object is to provide an endless belt formed of a tube of material having a top ply and a bottom ply with selvaged edges formed by turning a portion of the edge of each ply on itself with opposing edges stitched together, arranged so that the body portion of the fabric is of substantially the same thickness as the selvaged edge portions either by modifying the structure at the edges for example, or eliminating at the edge portions the binder or gutting material which is usually used between the plies.

Various other objects are within the scope of this invention such as relate to the arrangement of the elements of the structure, to various details of construction and to economies of manufacture as suggested, and numerous other features which will be apparent from a consideration of the drawings and the related description of a form of the invention which may be preferred, in which—

Fig. 1 illustrates a tube of fabric cut to a width to form a belt, the edges of which are arranged to be selvaged to prevent ravelling.

Fig. 2 is an enlarged diagrammatic view taken on the line 2—2 of Fig. 1, through one half of the endless strip showing one embodiment of fabric for carrying out the invention.

Fig. 3 is a view similar to Fig. 2, taken on a line 3—3 of Fig. 5, with the edges of the upper and lower plies turned in on themselves to form the selvaged edges of the particular embodiment illustrated.

Fig. 4 is a sectional view showing the selvaged edges stitched in position.

Fig. 5 is a perspective view of the completed selvaged edged endless fabric.

Referring to the drawings it will be seen that I provide a section of a tubular fabric 10 which may have a plurality of plies including an upper ply 11 and a lower ply 12, of a type of fabric diagrammatically illustrated in Fig. 2. It is to be understood that any number of plies may be employed as desired. The upper and lower plies in the fabric shown are connected with a binder or gutting 13, this binder being brought outwardly in the weaving and cut away or eliminated at the edge portions as indicated at 15 and 16 of Fig. 2. A particularly advantageous feature, which may be used in the present construction, consists in dropping the binder or gutting 13 at the edges of the fabric along one of the threads 11' and 12' of the upper and lower plies of the fabric and likewise dropping the binder along one of the threads of the upper ply 11″ and along the thread 12″ of the lower ply. In this manner it will be seen that the edge portion 15 between plies 17 and 18, and the edge portion 16 between the plies 19 and 20 are of less thickness than the body portion 10 of the fabric and that the change in the fabric to form the edging follows along one of the lines (in this case longitudinal) of the thread of the fabric as shown at 11′ and 11″. It is to be understood that the edge portions of the fabric from which the selvaged edge is to be formed may be made by varying the relative thickness of the threads employed in the weaving at the body portion of the endless fabric 10 as compared with the threads used at the edge portions thereof and in other ways as will be understood by those skilled in the art.

To form the selvaged edges, the edge portions 17, 18, 19 and 20 are folded inwardly on themselves, preferably on the median line of the material forming the edge portions as indicated in Fig. 3 to turn the extreme ravel edges inwardly and the material is then stitched as indicated at 21 in Fig. 4, or otherwise connected as with a fabric cement, glue or rubber cement, to secure the inturned edges in position, thus forming the endless fabric with the selvaged edges as will be apparent from an inspection of Figs. 4 and 5.

A convenient method of eliminating the binder, and cutting and folding in the edges on a line with the body threads, consists in bringing the threads out as shown at 13′ in Fig. 2, cutting away the binder threads and cutting the plies of the fabric and turning the edges in with a suitable folding attachment in accordance with the process disclosed in my copending application filed of even date herewith, and to this end a convenient tool for cutting the binder along the line of the threads is illustrated in my other copending application also filed of even date herewith, especially when a plurality of belts are made from a single blank of tubular fabric. Any means may be employed, however, in cutting away the binder material along one of the threads of the fabric 10 at the edges thereof, cutting the correct width of edging and folding the same to form the selvaged edges.

It may be found desirable to apply a size or glue to the inturned edges as illustrated in Fig. 3 in order to temporarily retain the selvaged edges in position before the stitching operation.

It will thus be seen that I have provided a cheaper belt and a better belt than prior constructions as there are fewer stitchings, only one tubular fabric need be used and a more uniform fabric is produced. Moreover by dropping the binder threads or otherwise modifying the structure of the body portion of the fabric along the longitudinal thread thereof and forming the selvage therealong, it is apparent that there will be no tendency for the fabric, if used as a belt, to run uneven as all the threads of the body portion will be substantially longitudinal and parallel. Moreover if the tension of the stitching 21 on one side of the belt varies from that at the other side thereof, this will have little or no tendency to warp the fabric since there is a relatively small proportion of the fabric stitched and the body portion 10, thereof will control the shape and formation which the endless fabric will assume in contra-distinction to certain constructions wherein the endless fabric is stitched entirely across the body portion in which even the various tensions tend to cause disadvantageous effects.

It is apparent that, within the spirit of the invention modifications and different arrangements may be made other than as herein disclosed, and the present disclosure is illustrative merely, the invention comprehending all variations thereof.

Having thus described my invention what I desire to secure by Letters Patent of the United States and claim is:—

1. An endless fabric belt having an upper and lower ply and raw edges formed into a selvaged edge by an edge portion of the top ply turned back on itself and an opposite edge portion of the lower ply turned back on itself, and said turned edges secured together.

2. An endless belt formed of a fabric strip having an upper and lower ply with raw edges and a selvaged edge formed therefrom by one of said edge portions of less thickness than the body of the fabric turned back toward itself, in contact with the opposite edge portion of less thickness than the body of the fabric, and said contacting edges secured together.

3. An endless strip or belt formed of a single piece of tubular fabric having an upper and lower ply, and a filler material, and a selvaged edge formed by an edge portion of the top ply turned back on itself and an opposite edge portion of the lower ply turned back on itself, and said turned edges secured together, said selvaged edge being of substantially the same thickness as the body portion of the fabric.

4. An endless selvaged edge fabric strip comprising an endless body portion having an upper ply and a lower ply, and a binder, extending across the body portion of the strip to the inside of the selvaged edges, and a selvaged edge for said fabric strip comprising an edge portion of the top ply turned in on itself and an opposite edge portion of the lower ply turned in on itself, the turned in portions being stitched together.

5. An endless tubular fabric having an upper and lower ply and a selvaged edge formed by an edge portion of the upper ply turned back on itself inwardly and an opposite portion of the lower ply turned back on itself inwardly, said portions being stitched together and the thickness of the turned in edge portions when arranged opposite each other being substantially equal to the body portion of the fabric.

6. An endless fabric strip comprising a body portion having an upper and lower ply, and a selvaged edge portion at the upper and lower plies extending along a line of the threads of the body portion, said upper and lower selvaged edge portions being turned inwardly on the same to form the selvaged edged portions.

7. An endless fabric strip comprising a body portion having an upper and lower ply, the opposite edge portions of the fabric being changed along a line of the thread of the body portion to form the material for the selvaged edges of the fabric and the edges of the upper and lower ply being turned inwardly on the same to form the selvaged edged portions on said line and means to secure said edges together.

8. An endless fabric strip comprising a body portion having an upper and lower ply and a binder, said binder being cut away at the opposite edge portions of the fabric along a line of the thread of the body portion to form the material for the selvaged edges from the upper and lower plies of the fabric, said edges of the upper and lower plies being turned inwardly on the same to form the selvaged edged portions.

9. An endless woven fabric belt having a body portion and divided selvaged edge forming portions, one edge portion of the fabric being turned back and in contact with the opposite edge portion, and said edge portions secured together.

10. An endless belt formed of a tubular fabric strip having a body portion and divided upper and lower selvage edge forming portions, each edge portion turned back on itself and said turned edges secured together and of a thickness substantially equal to the thickness of the body portion.

11. An endless fabric strip comprising a body portion and a divided selvaged edge portion extending along a line of the threads of the body portion, said upper and lower portions of said divided selvaged edge portions being turned inwardly on the same to form the selvaged edged portions.

In testimony whereof, I affix my signature.

WILLIAM C. FISHER.